Nov. 22, 1927.  1,650,471
F. J. J. SERVAIS
SIGNAL LAMP FOR VEHICLES
Filed Feb. 6, 1926  2 Sheets-Sheet 1
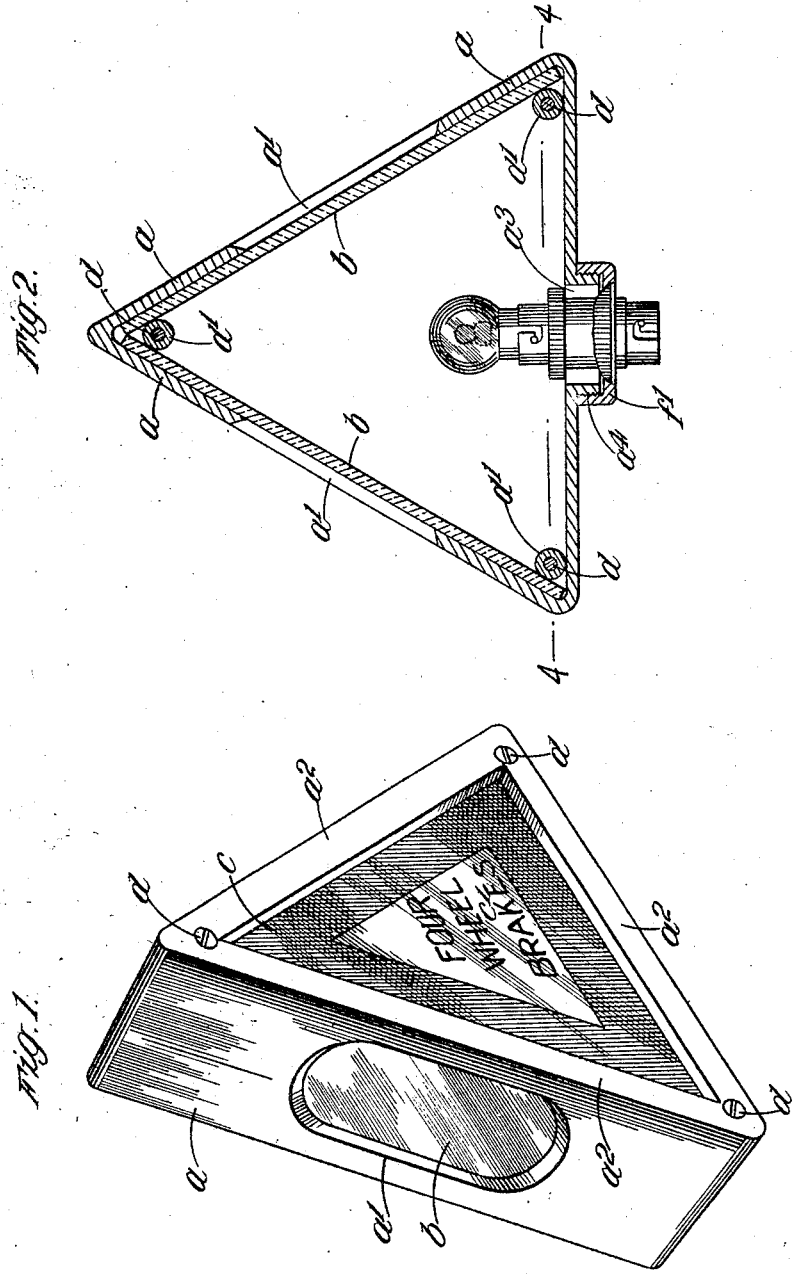
Inventor
Fernand J. J. Servais
By
Attorney

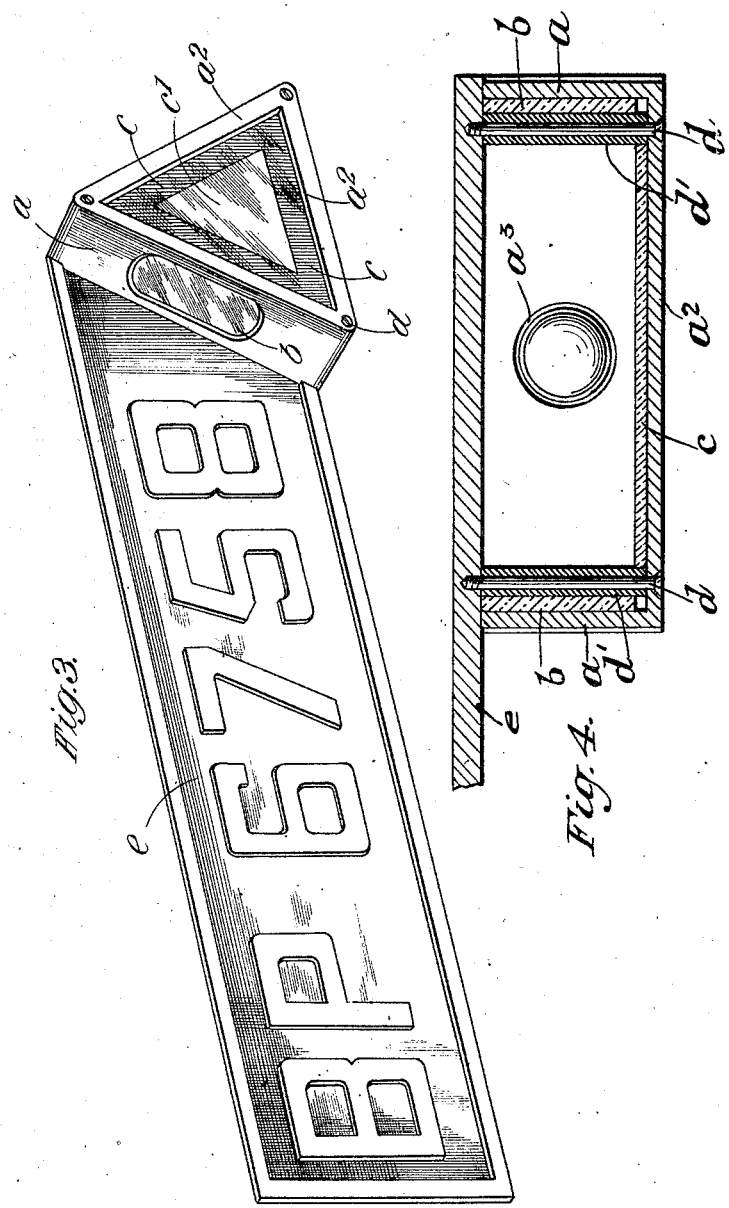

Patented Nov. 22, 1927.

1,650,471

UNITED STATES PATENT OFFICE.

FERNAND JILES JOSEPH SERVAIS, OF WESTMINSTER, ENGLAND.

SIGNAL LAMP FOR VEHICLES.

Application filed February 6, 1926, Serial No. 86,563, and in Great Britain April 9, 1925.

This invention relates to signal lamps for use at the rear of vehicles. According to this invention, the lamp is constructed of triangular form so as to exhibit a red triangle of which the centre is preferably opaque. The centre may, however, in some cases be translucent or transparent.

In order that this invention may be the more clearly understood and readily carried into effect, I will proceed to describe the same with reference to the accompanying drawings which illustrate the preferred embodiments of this invention, and wherein Figure 1 is a perspective view of a lamp according to this invention, and Figure 2 is a central vertical section of the same.

Figure 3 is a perspective view of a lamp according to this invention combined with a number-plate.

Figure 4 is a horizontal section on the line 4—4, Figure 2.

Referring to the drawings, the framework $a$ of the lamp comprises three side members, of which two are shown as having openings $a^1$ formed in them which are glazed with clear glass $b$. The face of the framework is provided with a triangular-shaped inwardly directed flange or margin $a^2$ against which the triangular glass face rests, one edge of each of the side glasses $b$ abutting against the triangular glass. The triangular glass face bears a red translucent triangle $c$ and a triangular portion $c^1$ within said red triangle. The lamp is provided with a suitable back plate which is connected to the front of the lamp by means of bolts $d$ arranged in the angles of the framework, the said bolts being provided with sleeves of rubber or other soft material $d^1$ which bears against the inner faces of the side glasses $b$. Instead of the sleeves $d^1$ a rubber buffer or lining may be laid in the angles and arranged so as to be maintained in place by the pressure between the bolts $d$ and the glass. Thus, the bolts $d$ serve the double purpose of securing the back of the lamp in place and of holding the glasses in position, the sleeves or the like $d^1$ on the bolts $d$ serving also to hold the glasses $b$ firmly in place and preventing breakage of the glasses due to vibration.

The back plate, when the lamp is for use on motor vehicles, may have a lateral extension to serve as a number-plate $e$ (Figure 3). In such a construction, one of the side glasses $b$ serves to illuminate the number, while the other side glass illuminates the kerb at the side of the road.

The base of the lamp has a central hole $a^3$ which is provided with an externally screw threaded depending flange $a^4$. The hole $a^3$ is of such size as to allow the usual electric bulb $g$, which is intended to illuminate the red triangle and the number-plate, to be freely inserted into, and withdrawn from, the lamp. The bulb is carried by the lamp holder $f$ which at its lower end is provided with an internally screw threaded cap $f^1$ to screw over the downwardly depending flange $a^4$ and thus hold the bulb firmly in position within the lamp. Thus, the bulb $g$ can be easily replaced by merely unscrewing the cap $f^1$ and withdrawing the holder $f$ from the lamp.

In some cases, the bulb may be passed through a hole formed in the back plate of the lamp.

The centre of the red triangle may be translucent or transparent, but it is preferred to make it opaque.

Also, the centre of the triangle may, in some cases, be provided with words or the like to give suitable warning to drivers approaching from the rear, such as "Four wheel brakes" if so desired.

It will readily be seen that lamps according to this invention will exhibit a red triangle at the rear of vehicles both by day and by night.

I claim:

1. A lamp having sides and base arranged in the form of a triangle the sides being provided with openings, a back and a front for said lamp, bolts connecting the said back and front together, resilient sleeves around said bolts, clear glass covering said openings and held in place between the said sleeves and the said sides of the lamp, a cover in the front of the lamp comprising an opaque triangle and bearing a legend surrounded by a red triangle, and means for illuminating the lamp.

2. A lamp having sides in the form of a triangle, one of said sides having an opening therein, a back and front for said lamp, bolts connecting the said back and front together, resilient sleeves around said bolts, clear glass covering said opening, a cover in the front of the lamp comprising a triangular portion surrounded by a red triangle, and means for illuminating the lamp.

3. A lamp having side members and a base member arranged in the form of a triangle the sides being provided with openings, a back member having a lateral extension adapted to bear a legend, a front member, bolts connecting the said back and front members together, resilient means associated with said bolts, clear glass covering said openings and held in place between the said resilient means and the said sides of the lamp, a cover in the front of the lamp comprising a triangular portion surrounded by a red triangle, and means for illuminating the lamp.

4. A lamp having three sides arranged in the form of a triangle, one of said sides having an opening therein, a back member having a lateral extension, a front member, bolts connecting the said back and front members together, resilient means associated with said bolts, clear glass covering said opening and held in place between the said resilient means and the side of the lamp having said opening, a cover in front of the lamp comprising a triangular portion surrounded by a red triangle, and means for illuminating the lamp.

5. A lamp comprising a casing formed of three side walls arranged in triangular relation, one of said side walls having an aperture, a back wall, and a triangular flange carried by the forward edges of said side walls, a triangular translucent plate in said casing resting against said flange, and a pair of plates in said casing each having one of its faces in juxtaposition to the inner side of one of said side walls and two of its opposite edges bearing, respectively, against said triangular plate and said back wall.

6. A lamp according to claim 5 wherein the back wall is separate from said side walls and which comprises means extending through the triangular flange adjacent each of the apices of the latter and engaging the back wall.

7. A lamp according to claim 5 wherein a resilient member is secured in each of the apices of the triangular casing against the inner side of one of the pair of translucent plates.

In testimony whereof I have signed my name to this specification.

FERNAND JILES JOSEPH SERVAIS.